United States Patent [19]
Betz

[11] Patent Number: 6,158,398
[45] Date of Patent: Dec. 12, 2000

[54] TURBOCHARGED ENGINE COOLING SYSTEM WITH TWO TWO-PASS RADIATORS

[75] Inventor: Michael D. Betz, Knoxville, Ill.

[73] Assignee: Caterpillar Inc., Peoria, Ill.

[21] Appl. No.: 09/316,859

[22] Filed: May 21, 1999

[51] Int. Cl.[7] .................................................. F01P 3/20
[52] U.S. Cl. ................................ 123/41.29; 123/41.31; 123/563
[58] Field of Search ........................... 123/41.29, 41.51, 123/41.31, 563; 60/599

[56] References Cited

U.S. PATENT DOCUMENTS

| | | | |
|---|---|---|---|
| 4,317,439 | 3/1982 | Emmerling | 123/563 |
| 4,520,767 | 6/1985 | Roettgen et al. | 123/41.1 |
| 5,353,757 | 10/1994 | Susa et al. | 123/41.29 |
| 5,669,338 | 9/1997 | Pribble et al. | 123/41.29 |
| 5,910,099 | 6/1999 | Jordan, Jr. et al. | 60/599 |

*Primary Examiner*—Willis R. Wolfe
*Assistant Examiner*—Katrina B. Harris
*Attorney, Agent, or Firm*—John L. Rogitz

[57] ABSTRACT

A dual circuit cooling system for a vehicle having an engine and a turbocharger aftercooler includes a modular radiator system having partitions in the tanks of the radiator. The partitions create separate radiator sections, and the partitions contain orifices that provide a crossover function between the sections. During cooler engine operating temperatures the engine thermostat closes which causes engine coolant to be circulated mainly within the engine, and which also causes pressure downstream of the thermostat to drop. The reduced pressure allows coolant from the aftercooler circuit to pass through a first crossover and circulate through the main radiator, then through a second crossover and back to the aftercooler circuit. During higher engine temperatures the thermostat opens, equalizing pressure between the circuits, thus creating normal flow through the circuits.

18 Claims, 1 Drawing Sheet

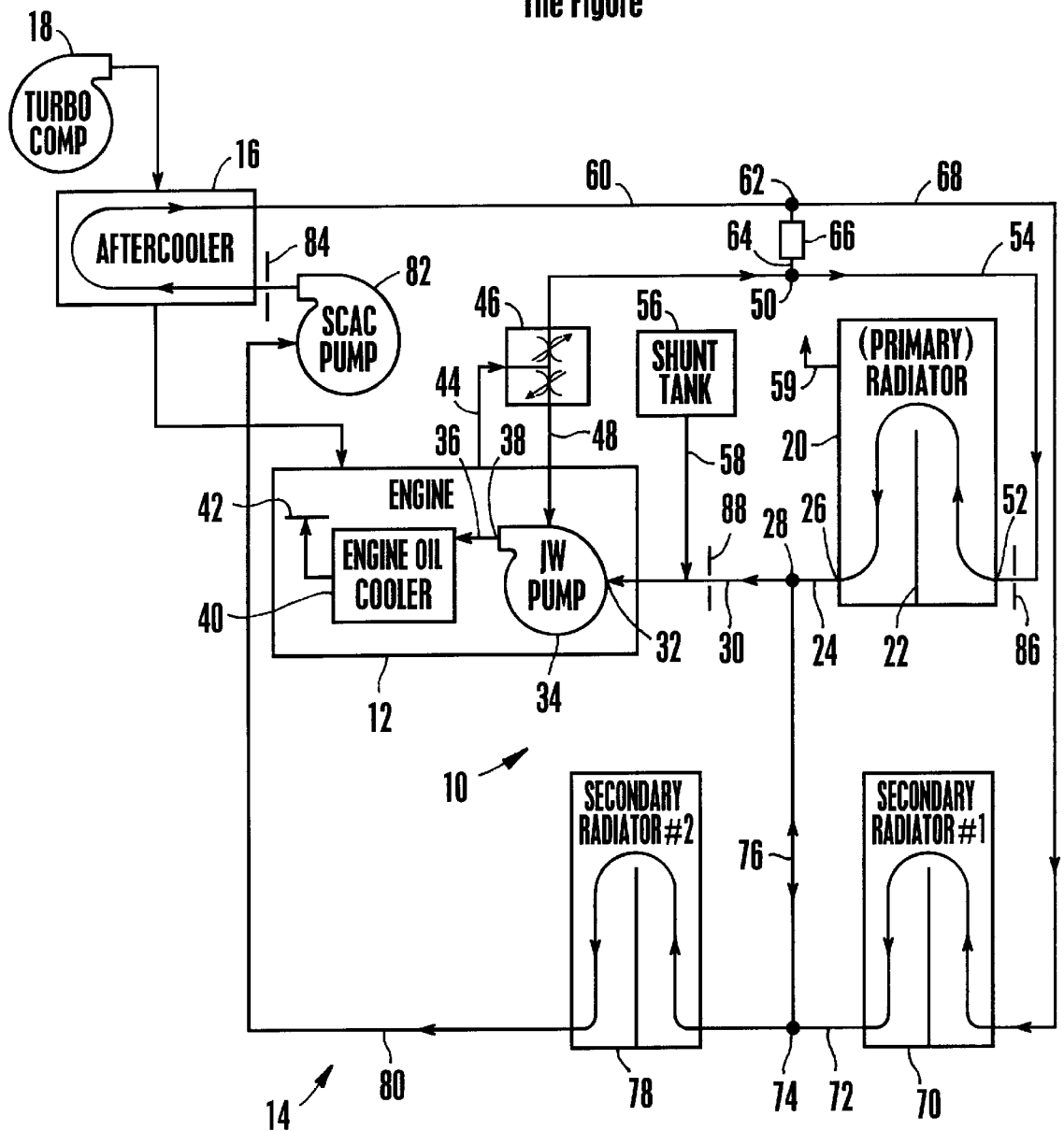
The Figure

TURBOCHARGED ENGINE COOLING SYSTEM WITH TWO TWO-PASS RADIATORS

RELATED APPLICATIONS

This application is related to co-pending U.S. patent application Ser. Nos. 09/187,381, filed Nov. 6, 1998, and 09/201,099, filed Nov. 30, 1998, both of which are incorporated herein by reference.

TECHNICAL FIELD

The present invention relates generally to engine cooling systems, and more particularly to turbocharged engine cooling systems having aftercoolers.

BACKGROUND ART

The operation of heavy mechanical equipment such as large tractors generates considerable heat in the engines of the equipment, which must be efficiently dissipated to prevent damage to the engine. This is generally accomplished by coolant-based radiator systems, in which a pump circulates coolant through tubes in a radiator. Air cools the tubes and, hence, the coolant, and the coolant is then pumped through various engine components, e.g., an engine oil cooler, to cool these components.

As recognized herein, many engines of heavy equipment are turbocharged. Turbochargers generate charge air for the engine which is used in the combustion process. To reduce engine emissions, the temperature of the charge air from the turbocharger should be minimized, and aftercoolers have been provided for this purpose. Coolant from the radiator can be used to cool the turbocharged air passing through an aftercooler.

Thus, it is important to minimize coolant temperature at normal operating conditions, both to effectively cool engine components and to reduce emissions in turbocharged engines. As recognized herein, however, it is further important to provide appropriate coolant flow rates at light loads, i.e., when the engine generates relatively little heat.

The above-referenced patent applications address both of these problems by providing multi-radiator, multi-pass dual circuit cooling systems. The present invention further understands that it is desirable and possible to better balance the heat load between heat removal circuits at low ambient temperatures and/or low engine heat loads. Specifically, the present invention understands that it is desirable that the temperature of the coolant supplied to the aftercooler be relatively independent from the temperature of the coolant from the system thermostat during low temperature conditions.

DISCLOSURE OF THE INVENTION

A cooling system for an engine includes what is in effect a variable capacity primary radiator flow path that includes one or more crossovers to an aftercooler flow path. With this structure, heat transfer balance is better maintained during low temperature conditions, thereby minimizing dynamic effects in mobile vehicle, as opposed to stationary, applications.

In another aspect, a cooling system for an engine and an aftercooler that is associated with the engine includes a primary radiator defining a primary radiator outlet and a primary radiator inlet. A jacket water (JW) pump pumps coolant from the primary radiator outlet to the engine, and at least one secondary radiator has at least one secondary radiator inlet in communication with the aftercooler. Also, the secondary radiator has a secondary radiator outlet communicating with an aftercooler. At least one crossover is provided for establishing communication between the aftercooler cooling circuit and the engine cooling circuit.

In a preferred embodiment, a first crossover establishes a pathway for fluid communication between the primary radiator outlet and the secondary radiator outlet. Moreover, a second crossover establishes a pathway for fluid communication between the primary radiator inlet and an outlet of the aftercooler.

As disclosed in detail below, the secondary radiator is an upstream secondary radiator, and the system further includes a downstream secondary radiator in fluid communication with the upstream secondary radiator via an interconnect. The first crossover establishes fluid communication between the interconnect and the primary radiator outlet. Preferably, the radiators are two-pass radiators. One particularly preferred embodiment includes a shunt tank disposed above the JW pump in fluid communication with a suction thereof.

Desirably, a flow restrictor is disposed in at least one of the crossovers. Indeed, flow restrictors such as orifices can be disposed in the primary radiator inlet and the primary radiator outlet, to establish the point at which no flow occurs between the circuits. The system is disclosed in combination with an engine and in combination with a vehicle.

In another aspect, a cooling system for an engine and an aftercooler associated with the engine includes an aftercooler cooling circuit and an engine cooling circuit. In accordance with the present invention, at least one of the circuits has an effective variable capacity established by virtue of at least one crossover between the circuits.

The details of the present invention, both as to its structure and operation, can best be understood in reference to the accompanying drawings, in which like reference numerals refer to like parts.

BRIEF DESCRIPTION OF THE DRAWINGS

The FIGURE is a schematic diagram of the present cooling system.

BEST MODE FOR CARRYING OUT THE INVENTION

Referring now to the Figure, a cooling system is shown, generally designated 10, for cooling an engine 12 of a vehicle, generally designated 14, and also for cooling a turbocharger aftercooler 16. In accordance with principles known in the art and as indicated in the Figure, the aftercooler 16 cools air from a turbocharger 18 prior to the air being injected as charge air into the engine 12. Preferably, the aftercooler 16 is a two-pass aftercooler.

The system 10 includes a primary radiator 20 having tubes through which coolant flows, with the outside surfaces of the tubes being exposed to air to cool the coolant in the tubes. In the preferred embodiment, the radiator 20 is a two-pass radiator that can have multiple cores or cooling elements 22 (only one core or cooling element 22 shown). In a particularly preferred embodiment, the primary radiator 20 is established by at least a portion of a radiator marketed by the present assignee under the trademark "AMOCS". By "two-pass" is meant that coolant flowing through the radiator 20 passes across the cooling element 22 twice, as indicated in the Figure.

After being cooled in the primary radiator 20, coolant enters a coolant supply line 24 from an outlet 26 of the radiator 20, and the coolant flows to a coolant supply three-way junction 28. From the coolant supply three-way junction 28, the coolant flow is divided into two paths for fluid communication. The first path is established by a JW pump suction line 30, through which coolant flows to a suction port 32 of a centrifugal-type jacket water (JW) pump 34. The JW pump 34 discharges coolant into a JW pump discharge line 36 through a JW pump discharge port 38, and the coolant then flows to an engine oil cooler 40 of the engine 12 and thence to other engine components 42, to cool the oil cooler 40 and components 42 in accordance with well-understood principles. The coolant then exits the engine 12 via an engine return line 44.

From the engine return lire 44, the coolant flows to a thermostat 46, preferably a variable orifice thermostat, that directs coolant into both an engine recirculation line 48 and toward a coolant return three-way junction 50. As shown, the engine recirculation line 48 establishes a path for fluid communication back to the JW pump 34, whereas coolant passing through the coolant return three-way junction 50 enters a primary radiator inlet 52 via a coolant return line 54. As the skilled artisan will recognize, the position of the thermostat 46 depends on the temperature of the coolant. At lower coolant temperatures, comparatively more coolant is passed through the recirculation line 48, while at higher coolant temperatures, most if not all coolant is directed back to the radiator 20 via the coolant return line 54.

As recognized by the present invention, coolant passing through a two-pass radiator can lose a significant amount of pressure head compared to the coolant head loss in a single-pass radiator, to the extent that the suction pressure of the associated JW pump can be unacceptably low. Accordingly, a shunt tank 56 is disposed above the suction port 32 of the JW pump 34 in fluid communication therewith via a static head line 58 and the JW pump suction line 30, to provide a static pressure head at the suction of the JW pump 34. If desired, the radiator 20 can vent to the shunt tank 56 via a vent line 59.

Having described the primary cooling circuit for the engine 12, attention is now directed to the secondary cooling circuit for the aftercooler 16, and the way by which the circuits are balanced at low temperatures. The aftercooler 16 sends coolant through an aftercooler return line 60 to an aftercooler return three-way junction 62. A first crossover 64 establishes a pathway for fluid communication between the aftercooler return line 60 and the coolant return line 54. The crossover can be a tube or orifice within a combined radiator structure. If desired, a thermostat or check valve 66 can be disposed in the first crossover 64 as shown. Or, an orifice can be disposed in the first crossover 64. In any case, a flow restrictor can be disposed in the first crossover 64.

Also, coolant can flow from the aftercooler return three-way junction 62 through a secondary coolant return line 68 to an upstream two-pass secondary radiator 70. Coolant then exits the upstream secondary radiator 70 and flows through an interconnect line 72 to a secondary radiator three-way junction 74. A second crossover 76 establishes a pathway for fluid communication between the interconnect line 72 and the coolant supply line 24 as shown. Also, coolant can flow from the secondary radiator three-way junction 74 to a downstream secondary radiator 78, which accordingly is in fluid series with the upstream secondary radiator 70. In effect, coolant directed to the aftercooler 16 passes first through a 4-pass radiative cooling system.

From the secondary radiators 70, 78, coolant flows through an aftercooler supply line 80 to a centrifugal-type separate circuit aftercooler (SCAC) pump 82. The SCAC pump 82 discharges coolant to the aftercooler 16 as shown.

If desired, the radiators 20, 70, 78 can be enclosed in a common housing. For example, the primary radiator 20 can be established by six of eight cores in the above-disclosed Caterpillar AMOCS radiator, and the secondary radiators 70, 78 can be established by the remaining two cores.

Completing the description of the preferred cooling system, an aftercooler supply orifice 84 is disposed in the supply line to the aftercooler 16, and a radiator supply orifice 86 is disposed in the coolant return line 54. Additionally, when a shunt tank 56 is included, a JW pump suction orifice 88 can be disposed in the JW pump suction line 30.

Industrial Applicability

Under "balanced" conditions, i.e., when the position of the thermostat 46 is such that the pressure at the coolant return three-way junction 50 is equal to the pressure at the aftercooler return three-way junction 62, no fluid flow occurs at either crossover 64, 76. The skilled artisan will readily appreciate that both secondary radiators 70, 78 are used exclusively for cooling the aftercooler 16 under "balanced" conditions.

On the other hand, at relatively low engine temperatures (due to low ambient temperatures and/or to low heat loads), the thermostat 46 directs relatively more coolant back through the recirculation line 48; under these conditions, the pressure at the coolant return three-way junction 50 is less than the pressure at the aftercooler return three-way junction 62. Consequently, coolant flows from the aftercooler return line 60 through the crossover 64 to the primary radiator 20. As a further consequence of this, coolant also flows from the coolant supply three-way junction 28 to the secondary radiator three-way junction 74 through the second crossover 76, back to the aftercooler supply circuit. With this in mind, it can now be appreciated that at low temperature conditions, when the full cooling capacity of the primary radiator 20 is not required to cool the engine 12, at least some of the excess cooling capacity of the primary radiator 20 advantageously is used in cooling the aftercooler 16.

Contrast the above operation with the fluid flow that occurs during periods of high temperature or high engine heat load. Under these circumstances, the thermostat 46 directs relatively less coolant back through the recirculation line 48; under these conditions, the pressure at the coolart return three-way junction 50 is greater than the pressure at the aftercooler return three-way junction 62. Consequently, coolant flows to the aftercooler return line 60 through the crossover 64 from the thermostat 46. As a further consequence of this coolant also flows to the coolant supply three-way junction 28 from the secondary radiator three-way junction 74 through the second crossover 76, to the engine cooling circuit. With this in mind, it can now be appreciated that at high temperature conditions, when more than the full cooling capacity of the primary radiator 20 might be needed to cool the engine 12, some additional engine cooling is accomplished by effectively adding some of the cooling capacity of the upstream secondary radiator 70 to the engine cooling circuit.

It may now be appreciated that as intended herein, the orifices 84, 86, 88 and the flow restrictor 66 are configured as appropriate to establish the flow rate through the coolant return line 54 (and, hence, the pressure at the coolant return three-way junction 50) at which no crossover flow occurs.

While the particular TURBOCHARGED ENGINE COOLING SYSTEM WITH TWO TWO-PASS RADIATORS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more".

What is claimed is:

1. A cooling system for an engine and an aftercooler associated with the engine comprising:

at least a primary radiator having at least one primary radiator outlet and at least one primary radiator inlet;

at least one jacket water (JW) pump disposed for pumping coolant from the primary radiate outlet to the engine;

at least one upstream secondary radiator having at least one secondary radiator inlet in communication with the aftercooler, the secondary radiator also having at least one secondary radiator outlet communicating with the aftercooler;

at least a first crossover establishing a pathway for fluid communication between the primary radiator outlet and the secondary radiator outlet;

at least a second crossover establishing a pathway for fluid communication between the primary radiator inlet and an outlet of the aftercooler; and at least a downstream secondary radiator in fluid communication with the upstream secondary radiator via an interconnect, the first crossover establishing fluid communication between the interconnect and the primary radiator outlet.

2. The system of claim 1, wherein at least one of the radiators is a two-pass radiator, and the system further comprises at least one shunt tank disposed above the JW pump in fluid communication with a suction thereof.

3. The system of claim 1, further comprising at least flow restrictor disposed in at least one of the crossovers.

4. The system of claim 1, further comprising at least one flow restrictor in fluid communication with the primary radiator inlet.

5. The system of claim 1, further comprising at least one flow restrictor in fluid communication with the primary radiator outlet.

6. The system of claim 1, in combination with an engine.

7. The combination of claim 6, in further combination with a vehicle.

8. A cooling system for an engine of a vehicle having an aftercooler, comprising at least a primary radiator having at least one primary radiator outlet and at least one primary radiator inlet;

at least one jacket water (JW) pump disposed for pumping coolant from the primary radiator outlet to the engine;

at least one upstream secondary radiator having at least one secondary radiator inlet in communication with the aftercooler, the secondary radiator also having at least one secondary radiator outlet communicating with the aftercooler;

at least a first crossover establishing a pathway for fluid communication between the primal radiator outlet and the secondary radiator outlet; and at least a downstream secondary radiator in fluid communication with the upstream secondary radiator via an interconnect, the first crossover establishing fluid communication between the interconnect and the primary radiator outlet.

9. The system of claim 8, wherein at least one of the radiators is a two-pass radiator, and the system further comprises at least one shunt tank disposed above the JW pump in fluid communication with a suction thereof.

10. The system of claim 8, further comprising:

at least a second crossover establishing a pathway for fluid communication between the primary radiator inlet and an outlet of the aftercooler.

11. The system of claim 10, further comprising at least flow restrictor disposed in at least one of the crossovers.

12. The system of claim 8, further comprising at least one flow restrictor in fluid communication with the primary radiator inlet.

13. The system of claim 8, further comprising at least one flow restrictor in fluid communication with the primary radiator outlet.

14. The system of claim 8, in combination with an engine.

15. The combination of claim 14, in further combination with a vehicle.

16. A cooling system for an engine and an aftercooler associated with the engine, comprising:

at least a primary radiator having at least one primary radiator outlet and at least one primary radiator inlet;

at least one jacket water (JW) pump disposed for pumping coolant from the primary radiator outlet to the engine;

at least one upstream secondary radiator having at least one secondary radiator inlet in communication with the aftercooler, the secondary radiator also having at least one secondary radiator outlet communicating with the aftercooler;

at least a second crossover establishing a pathway for fluid communication between the primary radiator inlet and an outlet of the aftercooler;

at least a first crossover establishing a pathway for fluid communication between the primary radiator outlet and the secondary radiator outlet; and at least a downstream secondary radiator in fluid communication with the upstream secondary radiator via an interconnect, the first crossover establishing fluid communication between the interconnect and the primary radiator outlet.

17. The system of claim 16, wherein at least one of the radiators is a two-pass radiator, and the system further comprises at least one shunt tank disposed above the JW pump in fluid communication with a suction thereof.

18. A cooling system for an engine and an aftercooler associated with the engine, comprising:

an aftercooler cooling circuit and an engine cooling circuit, at least one of the circuits having an effective variable capacity established by virtue of at least one crossover between the circuits, the aftercooler cooling circuit including at least two two-pass secondary radiators, at least one orifice being disposed in the system for defining a no-flow condition in the crossover.

* * * * *